R. T. EARLE.
FLOUR SIFTER.
APPLICATION FILED APR. 13, 1921.

1,398,367.

Patented Nov. 29, 1921.

WITNESS
A. E. Alberg.

INVENTOR
RICHARD T. EARLE

BY
White Prost Kraus
his ATTORNEYS

UNITED STATES PATENT OFFICE.

RICHARD T. EARLE, OF PORTLAND, OREGON.

FLOUR-SIFTER.

1,398,367. Specification of Letters Patent. Patented Nov. 29, 1921.

Application filed April 13, 1921. Serial No. 460,867.

*To all whom it may concern:*

Be it known that I, RICHARD T. EARLE, a citizen of the United States, and a resident of Portland, county of Multnomah, State of Oregon, have invented a new and useful Flour-Sifter, of which the following is a specification.

My invention relates to flour sifters and an object of the invention is to provide a flour sifter which requires but one hand for its operation. Another object is the provision of a flour sifter characterized by simple, inexpensive, construction and one in which rotary moving parts are absent.

My invention possesses other objects and features of advantage, some of which, with the foregoing, will be set forth in the following description of my invention. It is to be understood that I do not limit myself to the showing made by the said description, as I may adopt variant forms of my invention within the scope of the claims.

Figure 1:
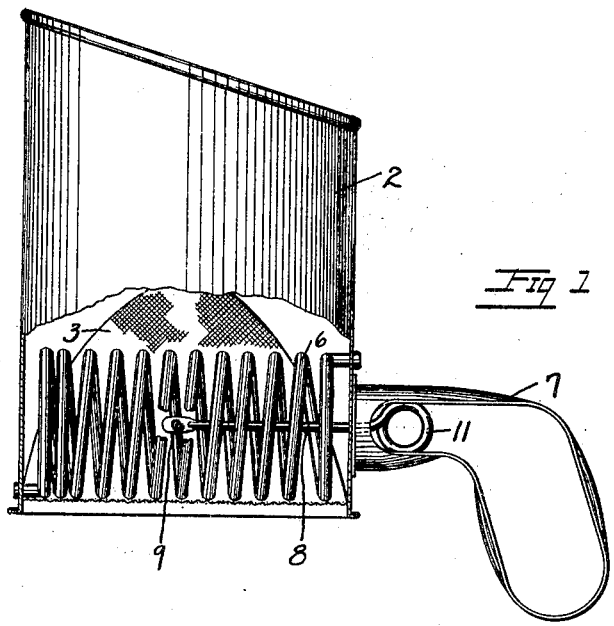
Figure 2:
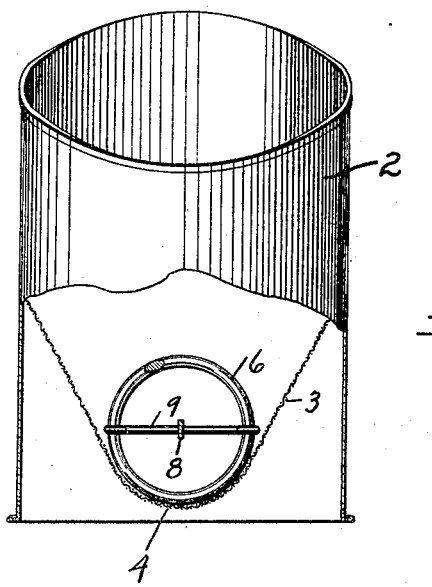

Referring to the drawings, Figure 1 is an elevation of my flour sifter, a portion being broken away to disclose the structure. Fig. 2 is another elevation taken in a plane at right angles to that of Fig. 1. A portion is broken away to better disclose the parts.

My flour sifter comprises a cup 2 made of sheet metal in the usual form and open at both ends. In the lower portion of the cup a foraminous bottom 3 is arranged as shown in the figures so that a cylindrical portion 4 is provided within which lies a coil spring 6. The ends of the spring are secured in any suitable manner in the wall of the cup, the intervening coils being left free to be moved back and forth over the foraminous bottom. On the outside of the cup and alined with the axis of the spring a pistol grip handle 7 is fixed. The handle may extend straight out from the side of the cup if desired but I prefer the pistol grip form of handle set quite close to the cup in order to facilitate handling of the device.

Intermediate the ends of the spring and preferably about the middle thereof a link 8 is attached by means of a cross bar 9 formed of wire and looped at its ends about the coil of the spring. The outer end of the link is formed into an eye 11 and preferably is disposed within the handle, which at this point is cut out on the side so that a finger of the hand grasping the handle may be inserted in the eye. Thus held, the spring may be alternately flexed and released by movement of the finger engaging the eye of the link. Every coil of the spring is thus moved backward and forward, effecting the necessary movement of the flour to cause it to pass through the foraminous bottom.

It is quite obvious that the link might be attached at different points in the spring than the one shown but I prefer an attachment substantially in the center because less exertion is then required and a more uniform motion throughout the full length of the spring is possible.

I claim:

1. A flour sifter comprising a cup, a foraminous bottom in said cup, a helical coil spring extending across said bottom, and means for alternately flexing and releasing said spring.

2. A flour sifter comprising a cup, a foraminous bottom in said cup, a helical coil spring extending across said bottom, a handle on said cup, and finger operated means adjacent said handle for alternately flexing and releasing said spring.

3. A flour sifter comprising a cup, a foraminous bottom in said cup, a coil spring arranged adjacent said bottom, a pistol grip handle on said cup, and finger operated means within said handle for alternately flexing and releasing said spring.

4. A flour sifter comprising a cup, a curved foraminous bottom in said cup, a coil spring arranged in said curved bottom, a handle fixed on said cup, and a link attached at one end to said spring intermediate its ends and terminating at the other end in an eye adjacent to said handle.

5. A flour sifter comprising a cup, a curved foraminous bottom in said cup, a coil spring arranged in said curved bottom, and fastened to said cup at its ends, a handle fixed on said cup, and a link attached at one end to said spring intermediate its ends and terminating at the other end in an eye adjacent to said handle.

In testimony whereof, I have hereunto set my hand.

RICHARD T. EARLE.